United States Patent
Mazzini

(12) 
(10) Patent No.: US 6,266,585 B1
(45) Date of Patent: Jul. 24, 2001

(54) GYROCOMPASSING BY INTERMITTENT GPS INTERFEROMETRY

(75) Inventor: Leonardo Mazzini, Rome (IT)

(73) Assignee: Alenia Spazio S.p.A., Rome (IT)

(*) Notice: Subject to any disclaimer, the term of this patent is extended or adjusted under 35 U.S.C. 154(b) by 0 days.

(21) Appl. No.: 09/554,654
(22) PCT Filed: Oct. 8, 1999
(86) PCT No.: PCT/IT99/00315
§ 371 Date: May 16, 2000
§ 102(e) Date: May 16, 2000
(87) PCT Pub. No.: WO00/22452
PCT Pub. Date: Apr. 20, 2000

(30) Foreign Application Priority Data

Oct. 12, 1998 (IT) .................... RM98A0638

(51) Int. Cl.[7] ................ G01S 5/07; G01C 21/00
(52) U.S. Cl. .............. 701/13; 342/420; 342/424; 343/357; 343/394; 343/420; 318/580; 318/581; 318/649
(58) Field of Search ............. 701/13, 214; 364/459; 342/357

(56) References Cited

U.S. PATENT DOCUMENTS

| | | | |
|---|---|---|---|
| 4,754,280 | * 6/1988 | Brown et al. | 342/357 |
| 5,101,356 | 3/1992 | Timothy et al. | 701/213 |
| 5,109,346 | * 4/1992 | Wertz | 364/459 |
| 5,412,574 | * 5/1995 | Bender et al. | 364/455 |
| 5,546,309 | * 8/1996 | Johnson et al. | 364/434 |
| 5,757,316 | * 5/1998 | Buchler | 342/357 |
| 6,088,653 | * 7/2000 | Sheikh et al. | 701/214 |

FOREIGN PATENT DOCUMENTS

| 196 51 543 C1 | 7/1998 | (DE) . |
|---|---|---|
| WO 98/29757 | 7/1998 | (WO) . |

* cited by examiner

*Primary Examiner*—William A. Cuchlinski, Jr.
*Assistant Examiner*—Tuan C To
(74) *Attorney, Agent, or Firm*—Herbert Dubno

(57) ABSTRACT

The invention described here concerns the use of GPS (Global Positioning System) interferometry, or any similar satellite constellation, to estimate the attitude of a vehicle, and is particularly suited for LEO (Low Earth Orbit) satellites. The invention is based on a system of gyroscopic and interferometric sensors and a piece of software to process the data received by such sensors. The invention can be applied to any type of vehicle (terrestrial, naval, aircraft or spacecraft) to determine the attitude of the vehicle with respect to an inertial reference system.

4 Claims, 2 Drawing Sheets

GYROCOMPASSING BY INTERMITTENT GPS INTERFEROMETRY

CROSS REFERENCE TO RELATED APPLICATIONS

This application is a national stage of PCT/IT99/00315 filed Oct. 8, 1999 and based upon Italian national application RM 98 A 000638 of Oct. 12, 1998 under the International Convention.

TECHNICAL FIELD

The invention described here relates to the use of GPS (Global Positioning System) interferometry, or any similar satellite constellation, to estimate the attitude of a vehicle, and is particularly suited for LEO (Low Earth Orbit) satellites. The invention can be applied to any type of vehicle (terrestrial, naval, aircraft or spacecraft) to determine the attitude of the vehicle with respect to an inertial reference system.

BACKGROUND ART

According to the present state of the art, in order to calculate the attitude of a vehicle, it is necessary to have two microwave sources in known positions of space. The presence of the GPS constellation realizes this condition and in fact various instruments are today available for such measurements (see references G and H).

Those instruments are designed to provide independent attitude measurements on three axes. The use of gyroscopic instrumentation is optional, and it is not needed for attitude measurement, but only to filter high frequency noise on measurement outputs. The basic scheme described in the literature (see references A and B) for satellite attitude estimation consists of:

- a constellation of N source satellites, each of which broadcasts an electromagnetic signal which makes it possible to perform interferometric measurements; and
- a receiver having four antennas (one of which for redundancy) pointed in the same direction.

According to the scheme indicated above, the differential phase measurement is performed by two pairs of antennas with respect to all the N satellites in the visibility field (a source satellite is meant to be in the visibility field when the signal coming from the satellite has a satisfactory signal-to-noise ratio). We have therefore a system of 2N equations in the three attitude unknowns. This system is solved by the pseudo-inverse method (least square solution).

A necessary condition for the solution of attitude equations is that there should be at least two source satellites in the visibility field of the antenna network. The accuracy of estimate depends on the differential phase errors due to an unbalancing of the hardware measurement device, or on phase errors caused by mutual interaction among antennas (multipath errors), or on a misalignment of antennas.

The antennas commonly used for this purpose are antennas having a wide field of view (70–80 degrees of visibility cone), which are often not suitable for interferometric measurements in terms of thermal sensitivity, phase measurement stability and coupling with satellite structure. This results in limitations for attitude estimation accuracy for those kind of methods. The following references summarize the state of the art relative to the invention described below.

A. J. K. BROCK: *GPS Tensor-GPS receiver for attitude and orbit determination*, ION-GPS 95, Palm Springs, Sept. 1995.

B. J. K. BROCK, R. FULLER, S. HUR-DIAZ, J. RODDEN: *"GPS Attitude and Orbit Determination for Space"*, Palo Alto, Calif. 94303.

C. C. E. COHEN: *Attitude Determination Using GPS*, Ph.D. Dissertation, Dec. 1992, Stanford University.

D. S. J. FUJIKAWA, D. F. ZIMBELMAN: *"Spacecraft Attitude Determination by Kalman Filtering of Global Positioning System Signals"*, Journal of Guidance, Control and Dynamics, 1995.

E. R. FULLER, S. GOMEZ, L. MARRADI, J. RODDEN: *"GPS Attitude Determination From Double Difference Differential Phase Measurements"*, ION-GPS 96, Kansas City, Sept. 1996.

The invention is described now in its essential aspects. The gyro makes it possible to calculate attitude variations but not absolute attitude itself. The basic principle of the invention rests on the fact that interferometric measurements can be correlated with each other, even if made in different moments or along different axes, due to the reconstruction that the gyro is able to do of the relative attitude variations in the various measurement times.

For this purpose, it is necessary to compare gyro output signals with those from an interferometer not at the attitude angle measurement level, but at the interferometric measurement level, performing a more efficient dynamic filtering of measurements.

Dynamic filtering is performed by an observer structure in which residuals are directly computed as differences between interferometric measurements of phase and estimated values.

If the vehicle motion is not inertial, as is the case with Earth-pointing satellites, substantial advantages come from this:

- attitude estimation requires only one source satellite in the field of view even intermittently (more than one satellite improves estimation but is not required; if the residual between interferometer and gyro were made on attitude angles, then at least two satellites would be required);
- GPS interferometry can be used with a narrow antenna field of view (typically 20 or 30 degrees for semi-cone angle) around the Nadir direction, avoiding collection of differential phase measurements in the lowest quality phase pattern zones (this makes it possible to have an accuracy less dependent on the satellite configuration and multipath problems);
- The particular type of dynamic filtering makes possible an on-line estimate of misalignments and constant phase errors (such a characteristic improves the overall system accuracy; the estimating filter speed of convergence depends on the orbital velocity and this function is particularly suited to LEO satellites, less suited to terrestrial vehicles).

The attitude measurement configuration described here consists of a three-axis gyroscopic sensor and an interferometric sensor having at least three antennas (plus one for redundancy) far apart from each other, a piece of processing software common to the two sensors and working on the raw data provided by the sensors (differential phases and angular velocities). The piece of processing software only needs, as its input, the position occupied by the source satellites and user vehicle and provides, as its output, estimates of the attitude and of the misalignment between the antenna system and the gyro reference system. The use of the gyroscopic instrumentation is similar to the one classically known as "gyrocompassing" and described in reference 1.

The described measurement configuration is capable of working for any kind of vehicle, however performance depends on the user vehicle trajectory and on the visibility of source satellites during the trajectory.

In the case of inertial pointing satellites, there is no chance of observing misalignments and receiver line offsets; then an operative step of calibration of Earth pointing should be taken. For illustrative but not limiting purposes, the description is now limited to the case of Earth pointing LEO satellites. The invention, however, can be applied to any vehicle.

SPECIFIC DESCRIPTION

Figure 1:
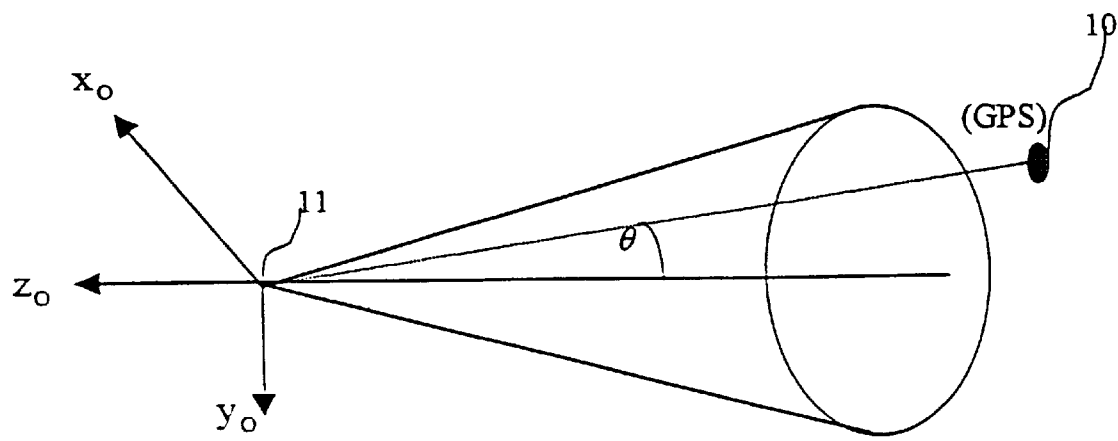
FIG. 1 is a diagram of a satellite system.

FIG. 1 shows the user vehicle 11 (in this case, a satellite) with its reference system $x_0$, $y_0$, $z_0$, the visibility cone 14 with its semi-aperture angle θ, and the source satellite 10.

Figure 2:
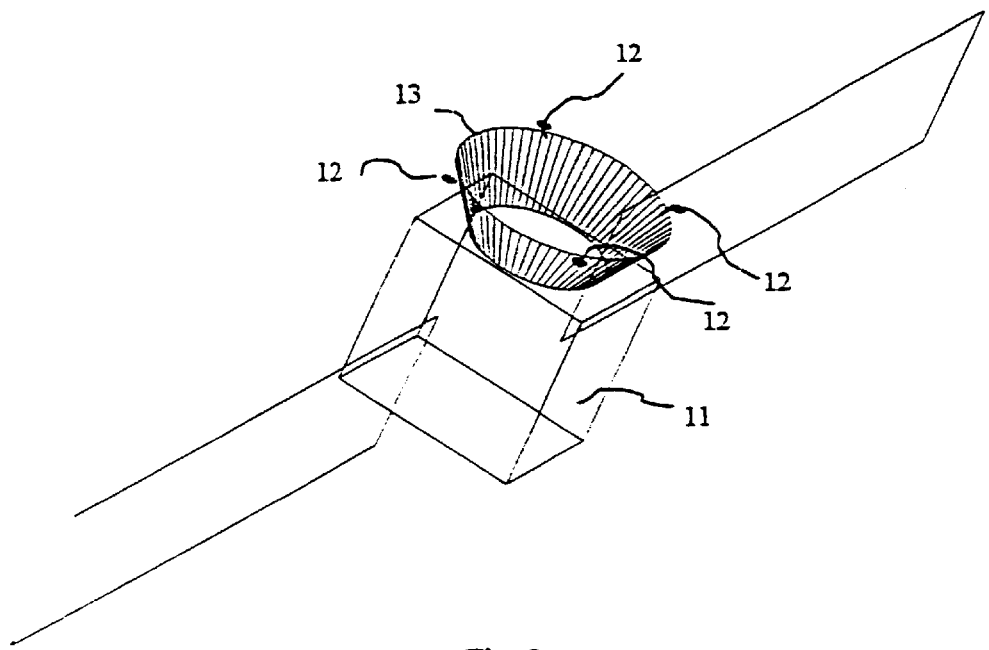
FIG. 2 is a more detailed view of the satellite.

FIG. 2 provides particulars of satellite 11. FIG. 2 shows satellite 11 with four receiving antennas 12 mounted in Zenith direction on a mounting cone 13 placed on the panel opposite to the Earth direction of satellite 11.

Figure 3:
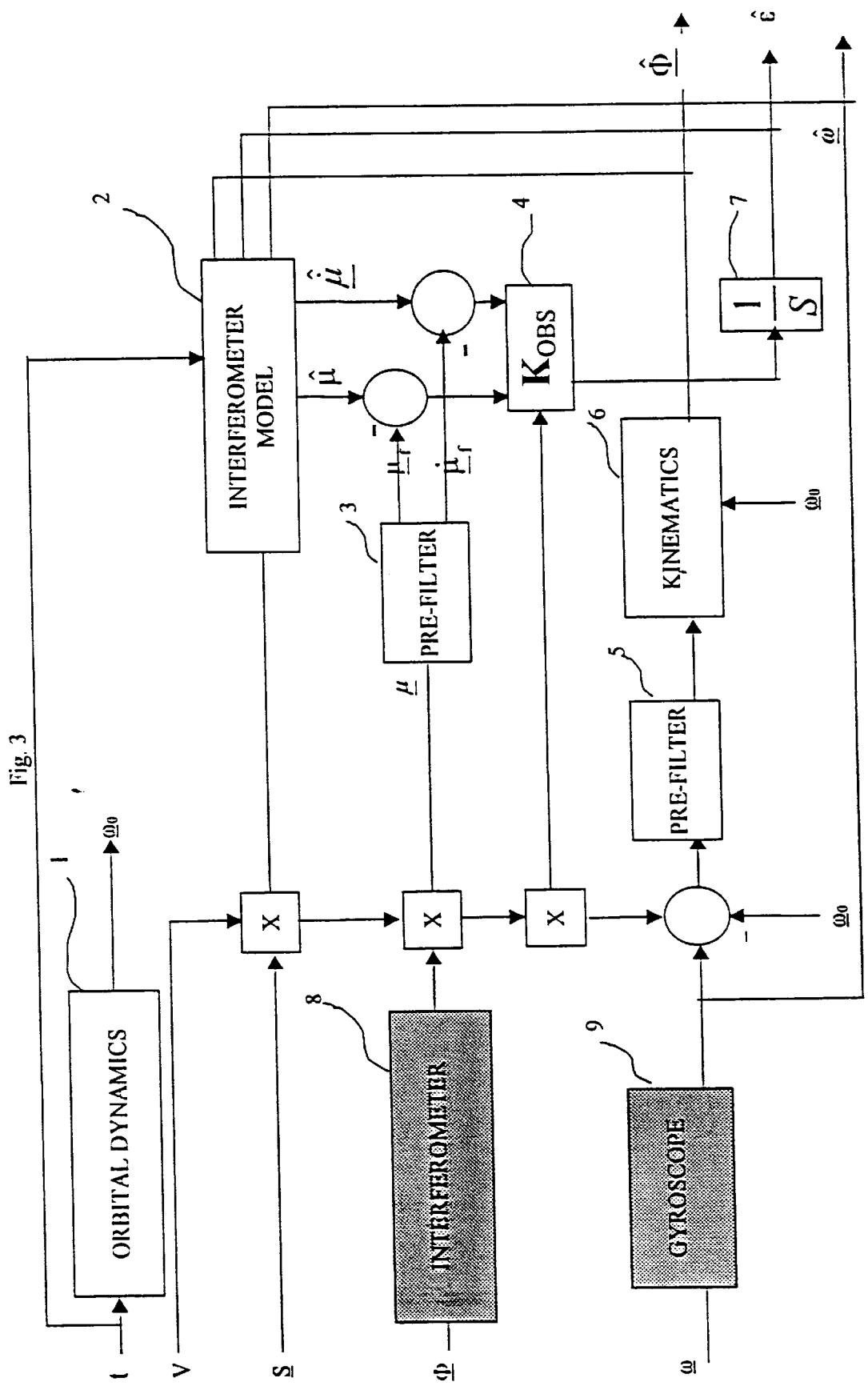
FIG. 3 is a block diagram.

FIG. 3 shows a block scheme of he estimator, as better described below.

When a satellite belonging to a constellation of source satellites, like GPS, comes into the visibility cone (i.e. 20° off-Nadir), an interferometric measurement is made possible (see FIG. 1).

The choice of receiving antennas depends on the system requirements. An antenna having a broad beam width, as is the case with the "micro-strip patches", has usually strong and hardly modellable multipath effects. The best choice for a high performance system is a medium-beam antenna having a low temperature-dependent error of tracking. The multipath due to such mobile surfaces of the satellite as solar panels should be kept outside the visibility cone.

For this purpose, mounting the antennas on a high cone (see FIG. 2) on the satellite makes the system able to reach superior performance.

As an example, with reference to FIG. 2, a satellite 11 having four antennas 12, each with a 60 degree beam width, mounted on a 30 cm high cone 13 is capable to restrain multipath errors in a semi-cone field of 30° of about ±+2°, which can change with temperature by ±+1 phase degrees. Additional constant errors that can be calibrated (including receiver bias) are about 5 phase degrees in magnitude. (Note: 1 degree in phase error corresponds to 0.03 degrees in attitude angle error, for a distance of 1 m between the antennas).

The estimator structure is shown in FIG. 3. The on board software components are identified by using white boxes, whereas gray boxes are used to represent physical sensors.

The internal algorithms for each component are strictly related to the function performed by that component, for any specific implementation of the present invention. For this reason, the mathematical structure of such algorithms is not described here. Referring to FIG. 3, the symbols shown are:

t: time (On Board Reference Time);

v: visibility of the microwave source(s);

s: direction of the source in orbital reference frame;

Φ: attitude relative to orbital reference frame;

ω: inertial angular velocity;

$\hat{\omega}$: estimated inertial angular velocity;

$\omega_0$: orbital angular velocity;

What is claimed is:

1. System based on GPS (Global Positioning System) interferometry or on any similar satellite constellation to measure the attitude of a vehicle (11), said system comprising:

a three-axis gyroscopic sensor (9);

an interferometric sensor (8) with multiple antennas (12), having at least three antennas, which measures the differential phase of the electromagnetic waves generated by source satellites (10), a piece of software for processing the data coming from said interferometric sensor (8) and from said gyroscopic sensor (9);

said piece of software comprising in turn orbital dynamics (1) which represents the equations providing the angular velocity of the orbit reference frame at a given time, interferometer model (2) which provides the interferometric measurements expected and their derivatives on the basis of the positions of said source satellites (10), of the calibrated misalignments and of the esteemed attitude, pre-filter (3) which performs the functions of pre-filtering on the interferometric measurements and of pseudo-derivator, pre-filter (5) which performs the pre-filtering of the signals coming from said gyroscopic sensor, estimator (4) which, starting from the residuals between said interferometric measurements and their derivatives and between said interferometric measurements expected and their derivatives, produces feedback of attitude angles on the observer, kinematics (6) which calculates the attitude angles with respect to orbit reference frame starting from the relative inertial angular velocity of said vehicle (11) with respect to orbit reference frame, integrator (7) which integrates the differential equations of said estimator (4); said piece of software being constructed and arranged to perform the following functions: decoding of the positions of said source satellites (10) and, through the processing of the data coming from said source satellites (10), determination of the position of said vehicle (11);

calculation of the three-axis attitude of said vehicle (11);

calculation of the constant measurement error of said interferometer (8) with respect to the natural reference frame of said gyroscope (9);

said estimator (4) uses the difference between the measurements from said interferometer (8) and the prediction of said measurements, as residuals whereby the measurements of the attitude of said vehicle is performed even if only one of said sources satellites (10) is in the field of view of said vehicle (11);

the attitude measurements of said vehicle (11) is performed even in conditions of temporary invisibility of said source satellites (10); and said estimator (4) performs on-line the calibration of static errors of measurements of differential phase.

2. The system claimed in claim 1 wherein said source satellites (10) may be one, or a constellation of satellites, or more constellations of satellites.

3. The system claim in claim 1 wherein said system can work for any type of said vehicle (11), and when said vehicle (11) is a satellite.

4. System based on GPS (Global Positioning System) interferometry or on any similar satellite constellation to measure the attitude of a vehicle (11), said system comprising:

a three-axis gyroscopic sensor (9);

an interferometric sensor (8) with multiple antennas (12), having at least three antennas, which measures the differential phase of the electromagnetic waves generated by source satellites (10), a piece of software for processing the data coming from said interferometric sensor (8) and from said gyroscopic sensor (9);

said piece of software comprising in turn orbital dynamics (1) which represents the equations providing the angular velocity of the orbit reference frame at a given time, interferometer model (2) which provides the interferometric measurements expected and their derivatives on the basis of the positions of said source satellites (10), of the calibrated misalignments and of the esteemed attitude, pre-filter (3) which performs the functions of pre-filtering on the interferometric measurements and of pseudo-derivator, pre-filter (5) which performs the pre-filtering of the signals coming from said gyroscopic sensor, estimator (4) which, starting from the residuals between said interferometric measurements and their derivatives and between said interferometric measurements expected and their derivatives, produces feedback of attitude angles on the observer, kinematics (6) which calculates the attitude angles with respect to orbit reference frame starting from the relative inertial angular velocity of said vehicle (11) with respect to orbit reference frame, integrator (7) which integrates the differential equations of said estimator (4); said piece of software being constructed and arranged to perform the following functions: decoding of the positions of said source satellites (10) and, through the processing of the data coming from said source satellites (10), determination of the position of said vehicle (11);

calculation of the three-axis attitude of said vehicle (11);

calculation of the constant measurement error of said interferometer (8) with respect to the natural reference frame of said gyroscope (9);

said estimator (4) uses the difference between the measurements from said interferometer (8) and the prediction of said measurements, as residuals whereby the measurements of the attitude of said vehicle is performed even if only one of said sources satellites (10) is in the field of view of said vehicle (11);

the attitude measurements of said vehicle (11) is performed even in conditions of temporary invisibility of said source satellites (10); and said estimator (4) performs on-line the calibration of static errors of measurements of differential phase, wherein said system can work for any type of said antennas (12) including antennas (12) provided with a thermal control system, or stable with temperature to 3 degrees of phase in the operating interval of temperatures, said antennas (12) having such a mounting system on said vehicle (11) or such an electromagnetic configuration as to contain the phase error due to multipath below 3 degrees in a visibility cone of 30 degrees from the axis of an antenna (12).

* * * * *